United States Patent [19]

McConnel

[11] 4,196,046

[45] Apr. 1, 1980

[54] ADJUSTER FOR CORRUGATING ROLLS

[75] Inventor: Ronald J. McConnel, Seattle, Wash.

[73] Assignee: Weyerhaeuser Company, Tacoma, Wash.

[21] Appl. No.: 914,655

[22] Filed: Jun. 12, 1978

[51] Int. Cl.² .......................... B31F 1/26; B29C 17/02; F16H 55/18

[52] U.S. Cl. .......................... 162/362; 93/60; 425/369; 425/396; 74/392; 74/409

[58] Field of Search .................. 74/409, 392; 425/396, 425/303, 336, 369; 162/362; 93/60

[56] References Cited

U.S. PATENT DOCUMENTS

| | | | |
|---|---|---|---|
| 2,397,126 | 3/1946 | Buhrendorf | 74/409 |
| 2,576,281 | 11/1951 | Carr | 74/409 |
| 3,512,477 | 5/1970 | Nelson | 74/409 |
| 3,730,803 | 5/1973 | Morrison | 425/303 |

*Primary Examiner*—James B. Lowe

[57] ABSTRACT

Apparatus is described for adjusting backlash clearances between the flutes of two meshing corrugating rolls, while the rolls are rotating, permitting minimization of noise levels. The corrugating rolls are driven through a pair of meshing helical gears, one of which is free to move axially on its drive shaft. A mechanism moves the helical gear axially, resulting in a slight rotation of the corrugating roll drive shaft, relative to the other corrugating roll. The preferred mechanism is mounted about the drive shaft of the movable helical gear. A hand wheel adjuster is threaded onto a sleeve fixed to a frame or other support and contacts the rotating helical gear through a bearing mounted on a second sleeve fixed to the gear. Rotation of the hand wheel adjuster causes the adjusting axial movement of the helical gear system.

3 Claims, 4 Drawing Figures

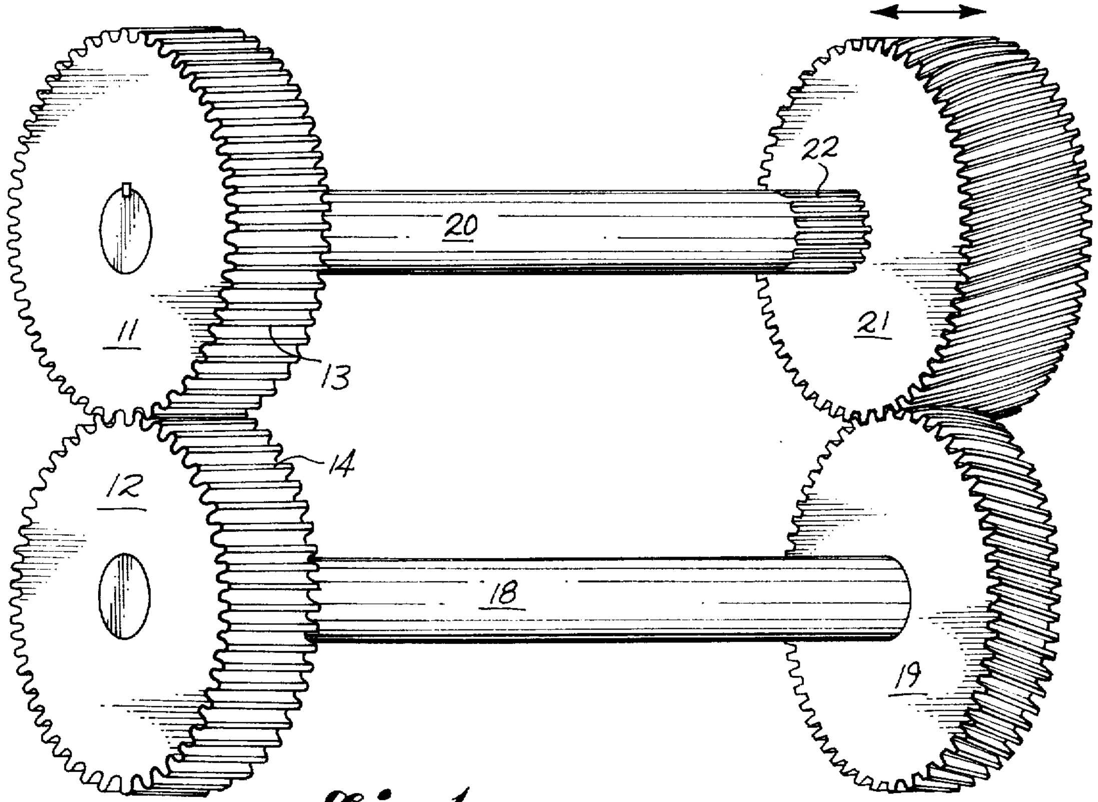
Fig. 1
Fig. 3
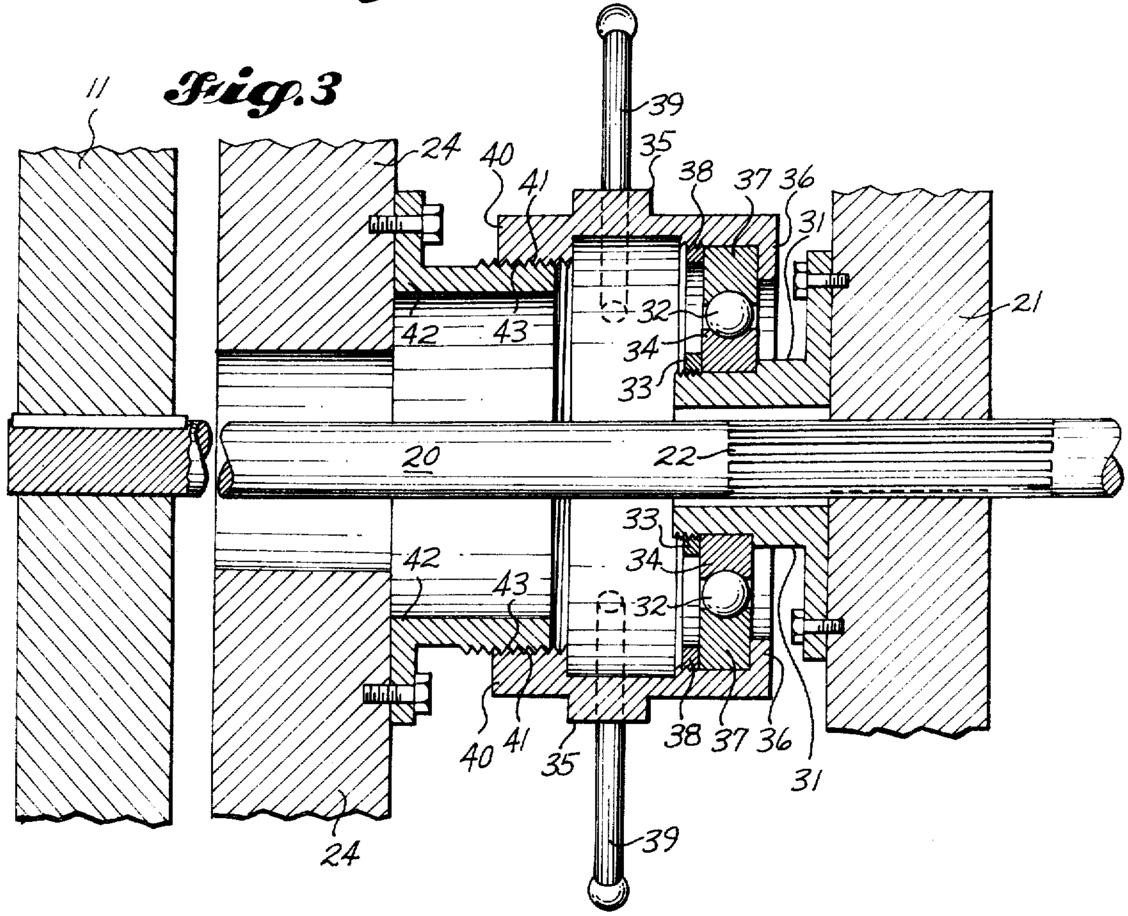

ADJUSTER FOR CORRUGATING ROLLS

BACKGROUND OF THE INVENTION

1. Field of the Invention

The invention relates to improving operation of machinery used for corrugating paper. More particularly, the invention is concerned with reducing corrugating roll wear and operating noise levels.

2. Description of the Prior Art

Corrugating medium, for use as the core portion of combined board, is commonly produced by passing a paper web through the nip of a pair of corrugating rolls. The corrugating roll is generally a metal cylinder with flutes or gear-like teeth milled into its lateral surfaces. The flutes run parallel to the axis of the rolls, perpendicular to a machine or web direction. A pair of corrugating rolls are mounted horizontally to form a nip with the teeth or flutes meshed. Paper medium, often plasticized by steam, is passed through the roll nip and thus pressed into sinusoidal comformity with the meshing roll flutes.

While the corrugating process and apparatus have long been known, several problems continue to confront producers. For example, since the flutes of the corrugating roll are in constant contact with each other and the paper medium, rapid wear of the flutes occurs. As the wear of the flutes progresses, the "backlash" or clearance between the radial sides of the flutes changes. These variations can result in poor product quality. Fracturing of the paper web as the flutes are formed is a typical defect caused by these machinery clearance deteriorations.

Correction for wear changes has required, in the past, shutting down the machine and partial disassembly to reset the backlash clearances. Careful work by a skilled mechanic is required and production time is lost. Often producers must continue to operate, accepting a higher percentage of reject material so that production goals may be met.

The flute wear experienced, plus generally the high impact stresses occurring as the flutes mesh and contact one another and the web, has required that the rolls and flutes be of heavy metal construction. This design limitation adds capital expense and makes experimentation with new corrugated core configurations difficult.

The clashing and ringing of the heavily constructed flutes during operation creates excessive noise levels in the corrugating plant. Operator safety and comfort are adversely affected by these noise levels.

An object of this invention is to provide a corrugating machine layout and adjusting apparatus that permits adjusting the backlash clearances of the corrugating roll flutes, while the machine is in operation, to reduce flute wear.

The invention further provides as an object the capability of fine tuning corrugators during operation to reduce noise levels caused by the clashing and ringing of roll flutes.

The corrugating medium produced is of improved quality since flute fracturing of the medium can be reduced by the roll backlash adjustments.

In sum, it is an object of the adjusting mechanism of this invention to reduce capital machinery costs, wear and maintenance costs, and to improve product quality by reducing friction or drag on the medium and weakening the sheet during corrugating.

It is a further object of the invention to provide a system that may be backfitted on existing machinery.

SUMMARY OF THE INVENTION

The invention is an improved corrugating roll pair arrangement that permits adjustment of corrugating roll flute backflash clearances during operation of the machine.

The two fluted corrugating rolls, well known in the art, are mounted in intermeshing relationship with parallel drive shafts. The lower roll is driven by a motor through a helical gear mounted on a shaft. The upper corrugating roll is driven by a second helical gear meshing with the first, lower helical gear. The second helical gear is splined to the upper shaft, free to move axially on the shaft but not, with respect to the shaft, circumferentially.

A means for positioning the second helical gear axially on a shaft is provided. It is fixed to a support and contacts, through a bearing means arrangement, the rotating helical gear. The positioning means may be manually operated to effect changes of axial position of the helical gear. The change in position translates into rotation of the second shaft relative to the first corrugating roll drive shaft. Shaft rotation results in a rotation of the upper corrugating roll while the rotational position of the lower roll remains unchanged. Thus, flute backlash clearances, that is, clearances between flute lateral surfaces, may be adjusted by operating the positioning means. Since the changes are made with the machine operating, the result can be almost instantaneously observed and further adjustment made.

A preferred embodiment of the positioning means invention comprises a first sleeve fixed to the helical gear about the upper corrugating roll drive shaft so the gear is completely free to move axially. A ball bearing is fixed to this sleeve with the inner race fixed to rotate with the gear. An adjusting means element of the positioner comprises a base, such as structural framework supporting the corrugating rolls; a second sleeve means fixed to the base about the upper corrugating roll drive shaft, so that the shaft is free to rotate; and an adjusting wheel means threaded to the second sleeve and secured to the outer race of the ball bearing whose inner race is secured to the first sleeve. Rotation of the adjusting wheel exerts, by reason of the threaded connection between the base and the wheel, an axial force against the ball bearing, which force is translated into movement of the helical gear axially. As the second helical gear moves axially, it is forced by the constraining presence of the other rotating gear to follow the path of the helical gear form. The upper shaft rotates slightly, relative to the first shaft, resulting in a backlash clearance adjustment between the corrugating roll flutes.

BRIEF DESCRIPTION OF THE DRAWINGS

FIg. 3 is a partial section of a preferred assembled adjusting mechanism.

FIG. 4 shows an elevation view of a paper passing through a nip formed by the fluted corrugating rolls.

DESCRIPTION OF THE PREFERRED EMBODIMENT

Figure 1:
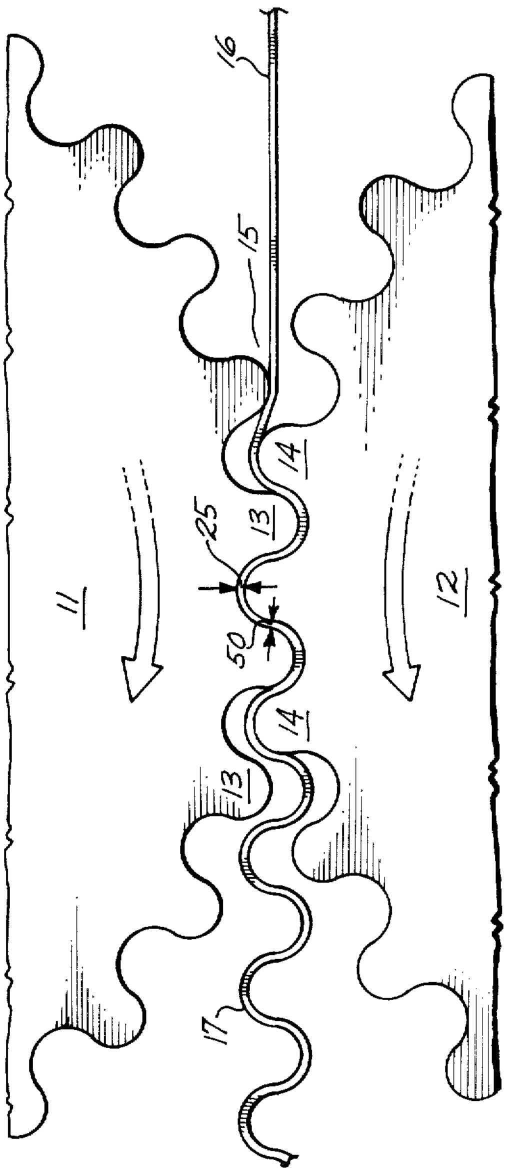
FIG. 1 is a schematic of the corrugating rolls and the helical drive gears of this invention.

Referring to FIGS. 1 and 4, the schematic drawings depict a corrugating machine. The corrugating rolls 11, 12 are well known and are of the type having flutes 13, 14 milled or cut into their lateral surfaces. The rolls 11, 12 are meshed, as shown in FIG. 4, to form a nip 15. A paper web 16 fed through the nip 15 is formed by the flutes 13, 14 into corrugating medium 17.

The lower corrugating roll 12 is fixed to a drive shaft 18. Helical gear 19 is fixed to the shaft 18 and receives power, for turning the rolls, typically from an electric motor (not shown). The helical gear may either be coupled directly to the motor output shaft or be driven by a pinion gear meshing with the helical gear.

Upper corrugating roll 11, in meshing contact with the lower corrugating roll 12, is fixed to drive shaft 20. An upper helical gear 21 is mounted upon shaft 20 and positioned to mesh with lower helical gear 19. The lower helical gear 19 transmits a portion of its rotational energy to the upper helical gear 21, thereby driving the upper corrugating roll 11.

Figure 2:
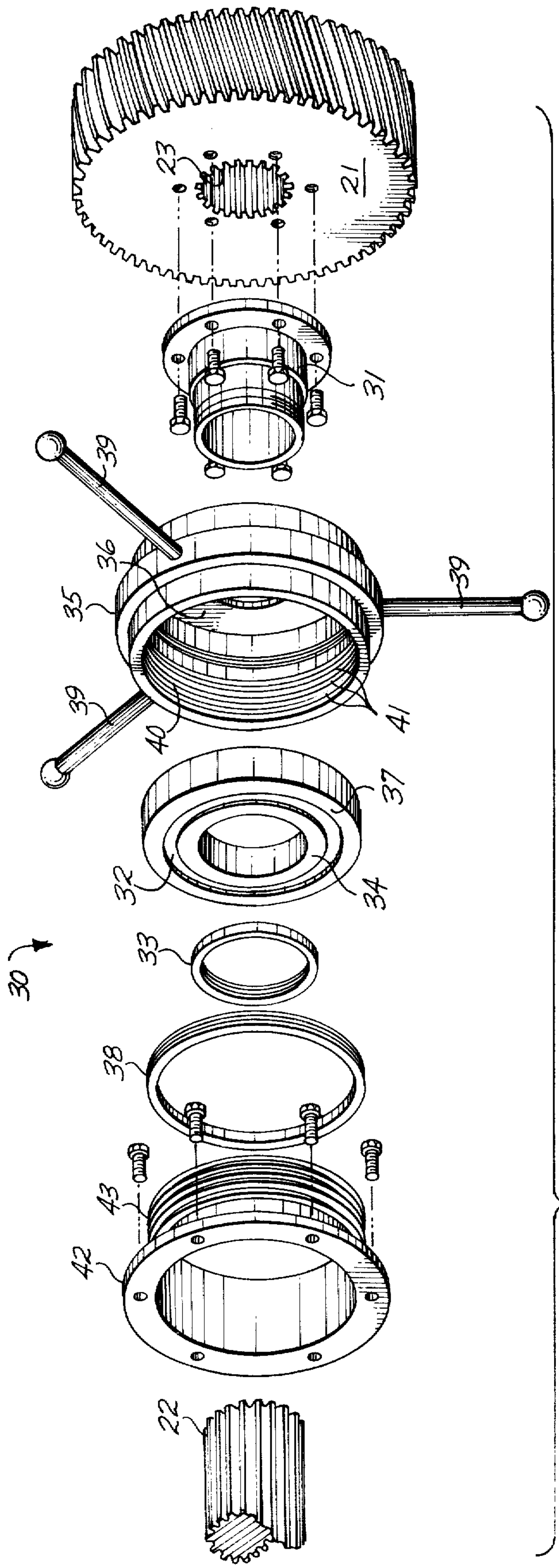
FIG. 2 shows an exploded oblique perspective of the preferred roll positioning elements.

The upper helical gear 21 is fixed to its shaft 20 so that the gear is free to move axially on the shaft. Referring to FIG. 2, a series of grooves are cut into the shaft 20 forming a spline 22. A keyway 23 is cut into the helical gear 21 for receiving the splined shaft portion. Tolerances are maintained so that the gear easily moves axially on the shaft.

Shaft 18 is supported by appropriate bearings fixed to a supporting frame. Neither the bearings nor the supports are shown in detail since they are entirely conventional. The upper roll 11 is urged against the lower corrugating roll 12 by an air or hydraulic operator (not shown) acting on shaft 20 near the roll 11.

The working clearance 25 between the corrugating roll flutes 13, 14 is set by the compressed corrugating medium itself as the rolls mesh or impact together. The upper roll, in effect, "floats" on the medium.

FIGS. 2 and 3 detail the preferred backlash adjusting mechanism 30 of the invention.

A sleeve 31 is bolted to upper helical gear 21. The sleeve rotates with the gear during operation of the machine, without interfering with or contacting shaft 20. A ball bearing 32 is secured to sleeve 31 by retaining ring 33. Retaining ring 33 bears on the inner race 34 of the bearing so that the inner race rotates with the sleeve 31. The bearing selected must be of the type capable of supporting thrust loads in both directions.

Manual adjusting wheel 35 has lip 36 contacting the outer race 37 of bearing 32. Retaining ring 38 secures the bearing race 37 firmly against the lip 36 so that the outer bearing race rotates with rotation of the hand wheel, otherwise remaining stationary. Lever arms 39 extend from the wheel 35 to aid in applying rotational force to the wheel. The end portion 40 of wheel 35 is provided with threads 41.

A sleeve 42 is bolted to a support, such as a frame member 24 (FIG. 3), in alignment with the adjusting wheel 35. The sleeve 42 is provided with threads 43 which thread into adjusting wheel threads 41.

In operation, rotation of hand wheel 35 transmits a thrust force in the axial direction through bearing 32 to helical gear 21. Hand wheel adjustment requires the application of very little effort to accomplish changes in roll backlash. Of course, a mechanism could be added to power-assist and lock in the adjustments.

The helical gear 21 moves axially in response to the thrust force. However, since the upper helical gear 21 is meshed with the lower helical gear 19, it can only move axially in a path defined by the helical gear pattern of the helical gear. The helical gear tooth form may be imagined as consisting of an infinite number of staggered laminar spur gears, resulting in the curved cylindrical helix shape. Thus the path that the upper helical gear is constrained to follow is a curved one that imparts a slight rotation to the shaft 20. This rotation is translated to the upper corrugating roll as a relative change in the backlash clearances 50 between the corrugating roll flutes 13, 14, as shown in FIG. 4. This backlash change is made during operation of the corrugator and allows "tuning" of the roll for the best operating efficiency.

Gears, as they rotate, roll tooth faces against one another at their points of contact. Corrugator flutes, however, are cut in roughly a sinewave form. In operation, the teeth have minimum tooth face contact and bottom together with a certain degree of impact. If the rolls are not accurately set up or as flute wear progresses, there is more contact between tooth faces than necessary. These contacts impart a jerking, clashing action between the rolls, contributing to the high noise level associated with corrugating operations. These tooth face contacts also result in corrugating medium fracturing caused by tooth faces rubbing. The corrugating roll adjuster herein described permits fine adjustments during operation so that the flutes properly bottom together without unnecessary tooth face contact. Thus, noise level and wear are reduced.

The adjusting system described permits experimentation with corrugating mediums of new configuration or shape. Different flute shapes can be produced on the inventive machine making no modifications other than a simple change in backlash setting. These new core configurations could mean improved combined board strength.

At the least, corrugating medium produced is of improved quality since flute fracturing of the medium can be reduced by these simple roll backlash adjustments.

Since the invention permits a reduction of wear at the corrugating roll flutes, flute design and selection of materials for rolls is more flexible. Such flexibility will permit the use of lighter rolls, perhaps even of polymeric materials. For example, fluting surfaces might comprise spike-shaped projections, which could produce finished corrugating medium having an unconventional truss core configuration. These spike projections could be made of high-density plastic.

The adjuster described herein has other potential applications where it is important to adjust a rotating roll face relative to contact with another surface. For example, the adjuster for this invention could be used to adjust registry of colors in multi-color printing.

Modification of the adjusting mechanism and adaption for tuning large gears other than corrugating rolls is within the contemplation of the inventor. The basic inventive concept is independent of the particular adjusting mechanism shown. Substitution of equivalent parts in the adjusting mechanism will be apparent to those skilled in the art.

What is claimed is:

1. In combination with a corrugating machine of the type wherein a pair of rolls, each having longitudinally fluted lateral surfaces, are arranged so that the flutes of said rolls intermesh and said rolls, rotating about their longitudinal axes, upon receiving a paper web between them, presses a continuous series of corrugations into said paper as it passes therethrough, the improved arrangement for adjusting corrugating roll flute backlash clearances, during corrugating machine operation, comprising:

a first longitudinally fluted corrugating roll;

a first driving shaft upon which said roll is fixed for longitudinal rotation;

a first helical gear fixed to the first shaft, spaced axially from the first corrugating roll;

a motor means for driving said first helical gear;

a second longitudinally fluted corrugating roll, intermeshing with said first corrugating roll;

a second driving shaft, said second shaft arranged substantially parallel to said first shaft;

a second helical gear, splined onto said second shaft so that the second helical gear is free to move axially upon said shaft but not circumferentially with respect to said shaft, said second helical gear intermeshing with said first helical gear and spaced axially from the second corrugating roll; and an adjustable means for positioning said second helical gear axially along its driving shaft, wherein adjustment of said positioning means causes the second shaft to rotate relative to the first shaft as the second helical gear in axial movement is constrained to follow the confining helical gear form of the first helical gear, thereby resulting in rotational adjustment of the back-lash clearances formed by said second corrugating roll flutes relative to said first corrugating roll flutes, said clearance adjustment being firmly locked in place by said positioning means.

2. The apparatus of claim 1, wherein the positioning means for the second helical gear comprises:

a sleeve fixed to said second helical gear, mounted about the second shaft, said sleeve free to rotate with said gear;

bearing means, having an inner race that rotates with said sleeve;

a retaining means for securing said bearing inner race to said sleeve; and an adjusting means comprising a base, a second sleeve means, fixed to said base, mounted about said shaft but said shaft free to rotate without contacting said sleeve, having a threaded surface, and;

an adjusting wheel means, having a threaded surface in register with and threaded onto said second sleeve, a second surface in contact with the outer race of the bearing means, and a retaining means for fixing said outer race of the bearing means to said second adjusting wheel surface, wherein, upon rotation of said adjusting wheel about said threaded surface, an axial movement of said spline-mounted second helical gear on its shaft occurs thereby rotating said gear, constrained by the first gear, and consequently said second corrugating roll with respect to said first roll.

3. In combination with a pair of rotating cylinders forming a nip, an improved arrangement for adjusting the relationship between a particular portion of the circumferential surface of the first cylinder with respect to a particular portion of a circumferential surface of the second cylinder, by causing an angular rotation of the first drum, about its longitudinal axis, that is superimposed upon the usual continuing rotation of said first drum about its longitudinal axis, said arrangement, comprising:

a first drive shaft upon which a first cylinder is fixed;

a first helical gear fixed to said first drive shaft and spaced axially from the first cylinder;

a motor means for driving said first helical gear;

a second drive shaft upon which a second cylinder is fixed;

a second helical gear, intermeshing with said first helical gear, splined to said second shaft so that the helical gear is free to move axially but not circumferentially with respect to said second shaft, said gear spaced axially from said second cylinder; and a means for positioning said second helical gear axially along its shaft splines, wherein operation of said means, while the cylinder pair continues rotation, causes the second shaft to rotate relative to the first shaft as the second helical gear in axial movement is constrained to follow the confining helical gear form of the first helical gear, thereby resulting in a relative change in the relationship between the first and second cylinder circumferential surfaces.

* * * * *